(12) United States Patent
Doonan et al.

(10) Patent No.: US 6,807,277 B1
(45) Date of Patent: Oct. 19, 2004

(54) SECURE MESSAGING SYSTEM WITH RETURN RECEIPTS

(75) Inventors: Wes Doonan, Fairfax, VA (US); Albert J. Wettlaufer, Reston, VA (US)

(73) Assignee: Surety, LLC, Herndon, VA (US)

( * ) Notice: Subject to any disclaimer, the term of this patent is extended or adjusted under 35 U.S.C. 154(b) by 702 days.

(21) Appl. No.: 09/591,686

(22) Filed: Jun. 12, 2000

(51) Int. Cl.[7] .............................. H04L 9/08; H04L 9/12
(52) U.S. Cl. ....................... 380/281; 380/264; 380/279; 713/155
(58) Field of Search .............................. 380/29, 30, 27, 380/28, 282, 286; 713/155, 165, 168, 170, 201; 705/53

(56) References Cited

U.S. PATENT DOCUMENTS

| | | | |
|---|---|---|---|
| 5,448,641 A | 9/1995 | Pintsov et al. ................. | 380/51 |
| 5,481,613 A | 1/1996 | Ford et al. ..................... | 280/30 |
| 5,509,071 A * | 4/1996 | Petrie et al. ................... | 705/53 |
| 5,553,145 A | 9/1996 | Micali .......................... | 380/30 |
| 5,629,982 A | 5/1997 | Micali .......................... | 380/30 |
| 5,671,279 A | 9/1997 | Elgamal ....................... | 380/23 |
| 5,689,565 A | 11/1997 | Spies et al. .................... | 380/25 |
| 5,710,816 A | 1/1998 | Stork et al. .................... | 380/21 |
| 5,748,735 A * | 5/1998 | Ganesan ..................... | 713/165 |
| 5,790,677 A | 8/1998 | Fox et al. ..................... | 380/24 |
| 5,790,790 A | 8/1998 | Smith et al. ................. | 395/200 |
| 5,850,520 A | 12/1998 | Griebenow et al. .... | 395/200.36 |
| 6,014,688 A | 1/2000 | Venkatraman et al. ...... | 709/206 |
| 6,154,543 A | 11/2000 | Baltzley ..................... | 380/255 |

OTHER PUBLICATIONS

PR Newswire, "TIS Ships RecoverKey(TM) CryptAll(TM) Worldwide with No Restrictions," PR Newswire Association, Inc. 12 Jan. 1998.*

Baltimore Technologies, "Baltimore Technologies to Launch MailSecureTM at InforSecurity '97,"[online], Apr. 17, 1997, [retrieved on May 27, 2002]. Retrieved from the Internet: <URL: http://www.baltimore.com/new/press/1997/pr19970402.asp>.*

PCT/US01/18805—Notification of Transmittal of the International Search Report; mailed Dec. 4, 2001.

* cited by examiner

Primary Examiner—Justin T. Darrow
(74) Attorney, Agent, or Firm—Roberts Abokhair & Mardula, LLC

(57) ABSTRACT

A method and system for electronic messaging in which a sender of an electronic message receives a return receipt, without having to send the message contents to a third party. The sender contacts a server to obtain an encryption key to encrypt the message. The server returns an encryption key along with key retrieval information to the sender. The key retrieval information can be used to obtain from the server the decryption key corresponding to the returned encryption key. The sender encrypts the message using the encryption key and sends the message, along with the key retrieval information, to the recipient. The recipient sends the key retrieval information to the server to retrieve the corresponding decryption key. The recipient then decrypts the encrypted message received from the sender using the decryption key. When the recipient sends a request to obtain the decryption key, the server notifies the sender when the key has been successfully retrieved. The fact that the decryption key was retrieved by the recipient indicates to the sender that the recipient received the message.

13 Claims, 8 Drawing Sheets

Date: May 12, 2000 4:02 pm EST
To: < USER 10 >
From: < KEY SERVER >
Subject: Message key ID # 12345678

Message key was retrieval at 4:00 pm on May 12, 2000 by ALICE

FIG. 9

USER ID's Message Key Status

| Key ID # | Creation Date & Time | Key Locator | Retrieval Status | Recipient |
|---|---|---|---|---|
| 12345678 | May 11, 2000 11:21 am | .../AE437B | May 12, 2000 4:00 pm | ALICE |
| 4382166 | May 10, 2000 4:15 pm | .../BC3211 | Not Yet Retrieved | N. A. |
| : | : | : | : | : |
| : | : | : | : | : |

FIG. 10

SECURE MESSAGING SYSTEM WITH RETURN RECEIPTS

RELATED APPLICATIONS

NONE

TECHNICAL FIELD

The present invention is directed to a secure electronic messaging system that notifies the sender of a message when the intended recipient has received the message.

BACKGROUND OF THE INVENTION

To send electronic mail (e-mail) to a recipient, the sender generates the message contents, affixes to the message an identifier for each desired recipient, and transmits the message using the appropriate e-mail infrastructure. Proprietary e-mail products designed for departmental or enterprise use (Microsoft Exchange, Lotus Notes and Novell Groupwise, among others) are examples of such infrastructures. In addition, the Internet provides a standard infrastructure through which e-mail can be addressed and exchanged between senders and recipients outside the department or enterprise.

To send e-mail to a recipient across the Internet, a sender assembles the message contents, affixes to the message the Internet e-mail addresses of the desired recipients, and transmits the message using the Internet e-mail infrastructure. The Internet e-mail infrastructure consists of a group of cooperating mail transfer agents, which perform "best-effort" delivery on behalf of the sender, using a "store and forward" mechanism. That is, when the sender transmits an e-mail message using the Internet e-mail infrastructure the message may pass through a number of intervening mail transfer agents, each of which takes responsibility for forwarding the message along the route to the eventual destination or destinations. From the sender's viewpoint, once an Internet e-mail message has been transmitted, it is presumed to have been delivered to the recipient or recipients, unless notified otherwise. However, the sender cannot actually determine whether the recipient has in fact received the message, for example if one of the intervening mail transfer agents or network links has silently failed.

One solution to this latter problem is to set up an electronic "post office", such as that disclosed in U.S. Pat. No. 5,790,790 to Smith et al., whose contents are incorporated by reference to the extent necessary to understand the present invention. In such a system, a sender sends a message to a server and provides the recipient's e-mail address. The server then notifies the recipient that the server holds the recipient's message. Subsequently, the recipient downloads the message from the server and, when this happens, the server informs the sender that the recipient has retrieved the message. One drawback with this method, however, is that the message is transmitted through a mail transfer agent and held by a third party specially modified to generate return receipt information.

SUMMARY OF THE INVENTION

The present invention is directed to a method and apparatus that informs the sender of a message that the intended recipient has received a message, without having to send the message through a modified mail transfer agent.

More particularly, the invention implements a means for notifying message senders of an attempt by the recipient to access the contents of a message. Before sending a message, the sender contacts an external entity, known as a Key Server, to obtain an encryption key. The Key Server generates an pair of message keys, stores a copy of the decryption key, and returns the encryption key to the sender along with some information that can be used to retrieve the decryption key at a later time. The sender uses the encryption key to encrypt the message contents. The sender then transmits the message and the key retrieval information to the intended recipient using the existing mail infrastructure. When the recipient receives the message and wishes to read it, the recipient uses the key retrieval information provided in the message to retrieve the decryption key from the Key Server. When the key has been successfully obtained, the recipient decrypts the message to access the contents. When the Key Server determines that a particular decryption key has been retrieved, it notifies the original sender that the key has been retrieved. This basic methodology provides the sender with reasonable notification that the message was received by the intended recipient, and that the recipient has attempted to access the contents of the message.

BRIEF DESCRIPTION OF THE DRAWINGS

The present invention can better be understood through the attached figures in which:

FIG. 9 illustrates a return receipt sent by the key server to the sender; and

FIG. 10 illustrates a web page providing decryption key retrieval status information.

DETAILED DESCRIPTION OF THE INVENTION

Figure 1:
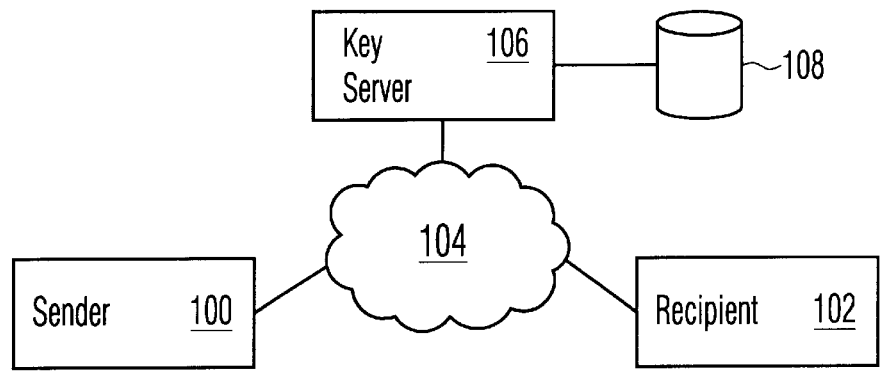
FIG. 1 presents the infrastructure that the preferred embodiment of the present invention.
Figure 2:
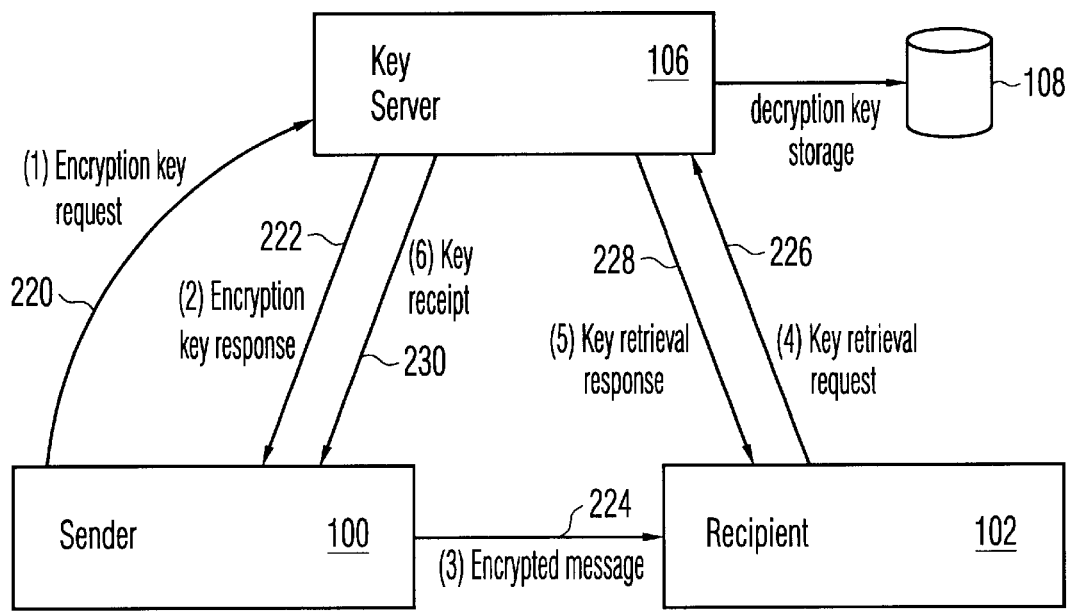
FIG. 2 presents the message flows among the various entities in accordance with the embodiment of FIG. 1.
Figure 3A:
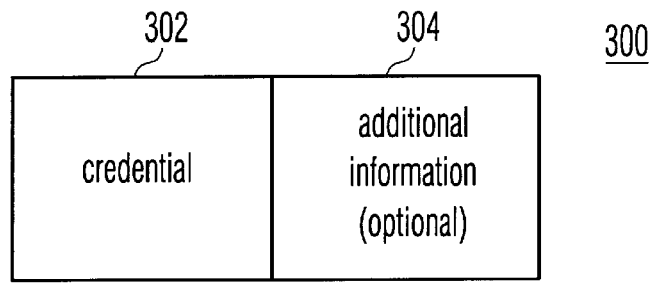
FIGS. 3a–3d depict the various requests and responses generated during the message flows of FIG. 2.
Figure 3B:
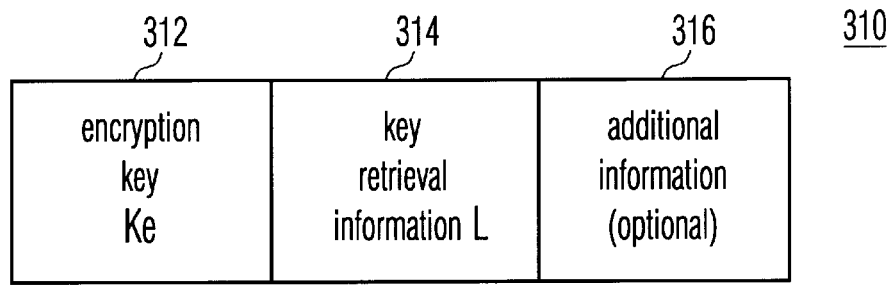
Figure 3C:
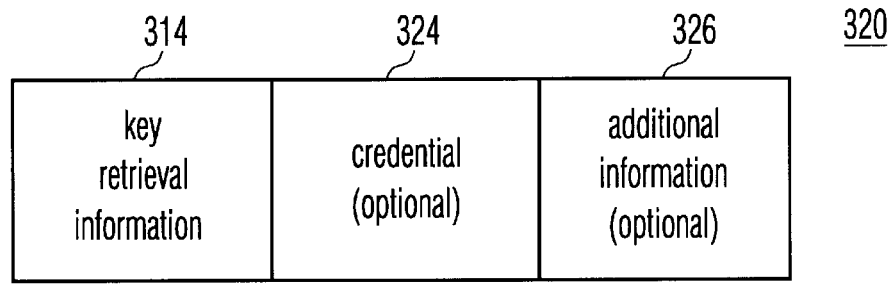
Figure 3D:
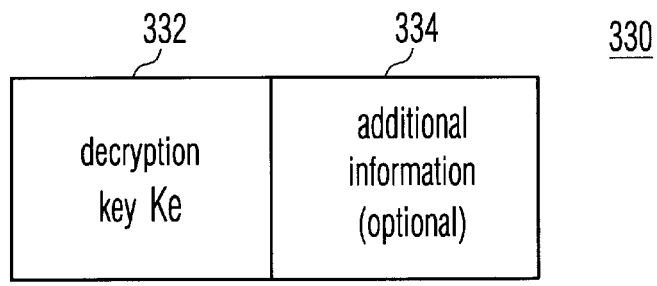

FIG. 1 illustrates the infrastructure for a preferred embodiment of the present invention. A sender 100 wishes to send a message to a recipient 102 via the Internet 104, and obtain confirmation that the recipient 102 received the message. To do this, the sender 100 requests an encryption key and key retrieval information from a Key Server 106. The sender 100 then encrypts the message with the key and transmits the encrypted message and key retrieval information to the recipient 102. To view the message contents, the recipient 102 is required to send the key retrieval information to a Key Server 106 having associated therewith a database 108. The key server 106 then returns the requested decryption key to the recipient 102. The recipient 102 then may use the decryption key to decrypt the message. After receiving the key retrieval information from the recipient 102, or after sending the decryption information to the recipient 102, the key server 106 notifies the sender 100 that the recipient 102 had requested (or was sent) the decryption key. This notification serves as a "return receipt" because it is interpreted by the sender to mean that the recipient received the encrypted message along with the key retrieval information and retrieved the decryption key needed to decrypt the message.

In a preferred embodiment, the sender, the recipient and the key server of FIG. 1 are software agents running on computers, each computer connected to the Internet 104 in a known manner. The sender and recipient communicate with each other via the Internet e-mail infrastructure, and communicate with the key server via the HTTP messaging protocol. It should be noted, however, that the various software agents may use other communication protocols and other communication channels, if desired.

In the typical case, senders and recipients are used by persons, who interact with software programs called mail user agents (MUAs) to compose and transmit Internet e-mail messages. Accordingly, the computers associated with such users (referred to for convenience as a "sender computer" and "recipient computer") typically are provided with an MUA program along with the necessary means for contacting the Internet e-mail infrastructure. Furthermore, these computers are normally provided with one or more input devices such as a keyboard, a mouse, along with both volatile and non-volatile memories. It should be noted, however, that senders and the recipients may instead be software programs not normally operated by a user, but rather operating in an unattended "server" mode.

FIGS. 2 and 3a–3d depict the message flows executed in accordance with the present invention. First 220, the sender 100 sends an encryption key request 300 to the key server. The encryption key request 300 includes the sender's credential information 302 along with other optional information 304. The encryption key request signifies to the key server that the sender is asking for an encryption key for use in encrypting a message to be sent. The request may be sent to the key server 106 in any number of ways, such as a secure HTTP request, an Internet e-mail message or a point-to-point link, among others. The credential information may include such things as a userid, password, e-mail address and perhaps other identifying information Second 222, the key server responds with an encryption key response 310, which preferably includes an encryption key Ke 312, key retrieval information 314 and possibly other additional information 316. The key retrieval information 314 is that information required by the recipient to retrieve the decryption key, as discussed further below. The decryption key 332 is conventionally a symmetric cryptographic key, 56 or 128 bits long, although other key types and lengths may also be used. The key retrieval information 314 is preferably a URL which directly or indirectly points to a copy of the decryption key 332 stored in the database 108, although other types of key retrieval information may also be used.

Third 224, sender 100 uses the Internet e-mail infrastructure to send an encrypted version of the e-mail message, along with the key retrieval information 314 to the recipient 102.

Fourth 226, the recipient 102 sends a key retrieval request 320 to the key server 106. The key retrieval request includes the key retrieval information 314, and may also include the recipient's credentials 324 along with other additional information 326.

Fifth 228, the key server 106 sends a key retrieval response 330 to the recipient 102. The key retrieval response includes the decryption key Kd 332 and may optionally include other additional information 334.

Sixth 230, the key server 106 sends a receipt to the sender 100 indicating the time that the decryption key 332 was retrieved along with other information, such as information identifying the recipient to whom the key retrieval response was sent. It should be noted, however, that neither the fifth nor sixth step depends on the outcome of the other.

To make use of a system in accordance with the present invention, the key server may require that the sender present a credential 302 in order to be granted access to the system. Credentials are obtained by having a user enroll into the system. Enrollment is a general process whereby a user presents some personal identifying information to the system, and obtains a credential in return. The credential can then be used in the future to determine if the user is authorized to access the system. It is possible for this credential to be empty in some embodiments, thus allowing unrestricted access to such a system. The personal identifying information may be checked for validity by the enrollment process. The credential may take the form of a username and password combination, a public key certificate, or other such identifying information.

Figure 4:
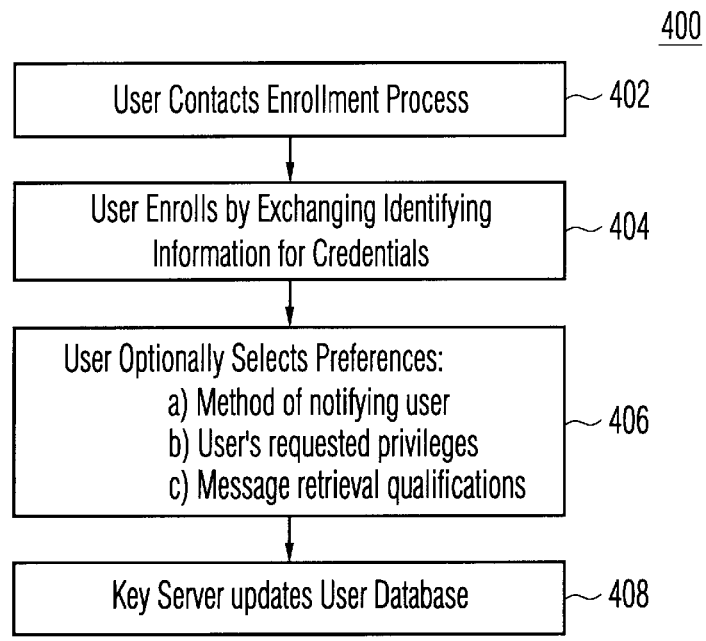
FIG. 4 presents a flowchart of the enrollment process.

The present invention contemplates that the sender enrolls with the key server before the sender can send messages to a recipient for which the key server will provide return receipts. FIG. 4 presents a flowchart 400 of the steps for enrolling a sender. In step 402, a user contacts the enrollment process and in step 404 presents some number of data items which uniquely identify the user to the enrollment process. Included among these identifying data items may be a simple pseudonym selected by the user, the user's full name, phone number, or email address. A typical implementation of an enrollment process is a registration form posted on a web site. In any event, once the identifying data items have been accepted by the enrollment process a credential is generated according to the authentication policy of the key server. Included among these credentials may be a userid and password selected by the key server or by the user, or a public key certificate issued by the key server. In step 406 the user may optionally select certain preferences pertinent to how the user wishes to interact with the Key Server. Included among these are, (a) how the user-sender will be notified of return receipts (e.g., by e-mail or by the user logging onto the web site and looking up the status of messages), (b) the privileges that the user would like (e.g., sending messages, receiving messages, or both), and (c) whether the user-sender wishes the Key Server to limit retrieval of the encryption key to only those recipients who are enrolled with the server. Finally, in step 408 the Key Server updates its database 108 with the new user's information and corresponding credential. Thereafter, the key server can use the credential to determine which enrolled user has requested a specific encryption or decryption key.

Figure 5:
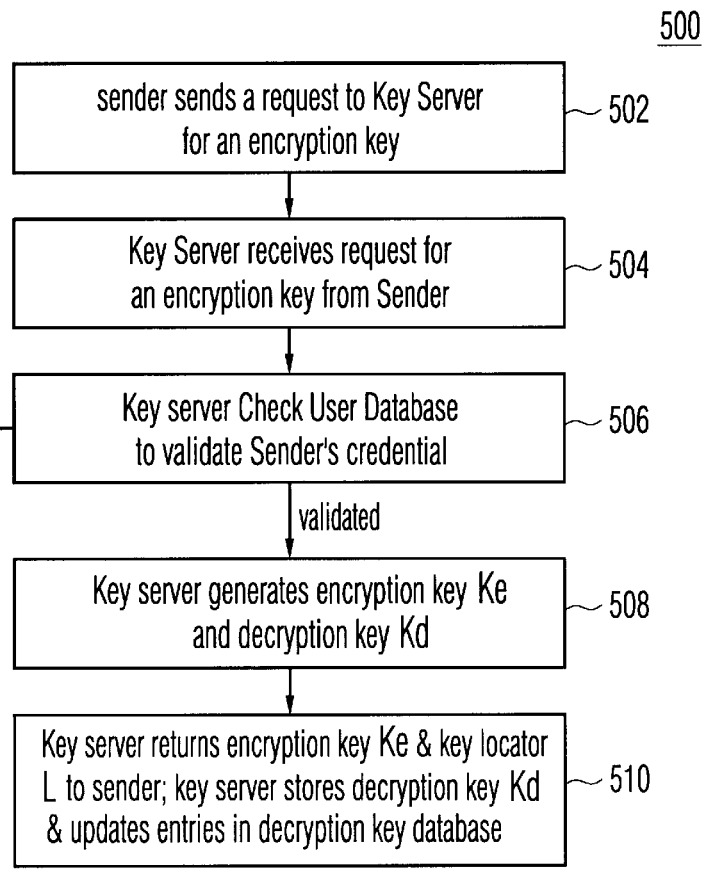
FIG. 5 is a flowchart showing the process for a sender to obtain an encryption key.

FIG. 5 shows a flowchart 500 for a key server 106 to respond to an encryption key request 300 from a sender 100. In step 502, the sender forms the encryption key request 300 and sends it to the key server 106. The encryption key request 300 includes the sender's credential 302 so that the key server can verify the enrollment status of the user.

In step 504, the key server 106 receives the key 300 request from the sender.

In step 506, the key server 106 validates the sender's credential to verify that the sender is authorized to request encryption keys. If the key server determines that the sender is indeed authorized to receive encryption keys, controls flows to step 508.

In step 508, the key server generates an encryption key Ke and a decryption key Kd, and stores at least Kd in a database. If a symmetric encryption algorithm is used, the encryption key Ke and decryption key Kd are identical. If an asymmetric encryption algorithm is to be used, the encryption key Ke and decryption key Kd are different.

In step 510, the key server then returns the encryption key Ke 312 to the requestor, along with key retrieval information L 314 sufficient to obtain a copy of the decryption key Kd 332 from the database. The encryption key Ke and key retrieval information L are linked in the database to the sender's identifying information.

If, at step 506, the key server determines that the sender's credential is invalid, an exception occurs, and control is transferred to step 512 where the key server informs the sender that the request is denied, and also possibly offers the user of the sender computer to enroll.

Figure 6:
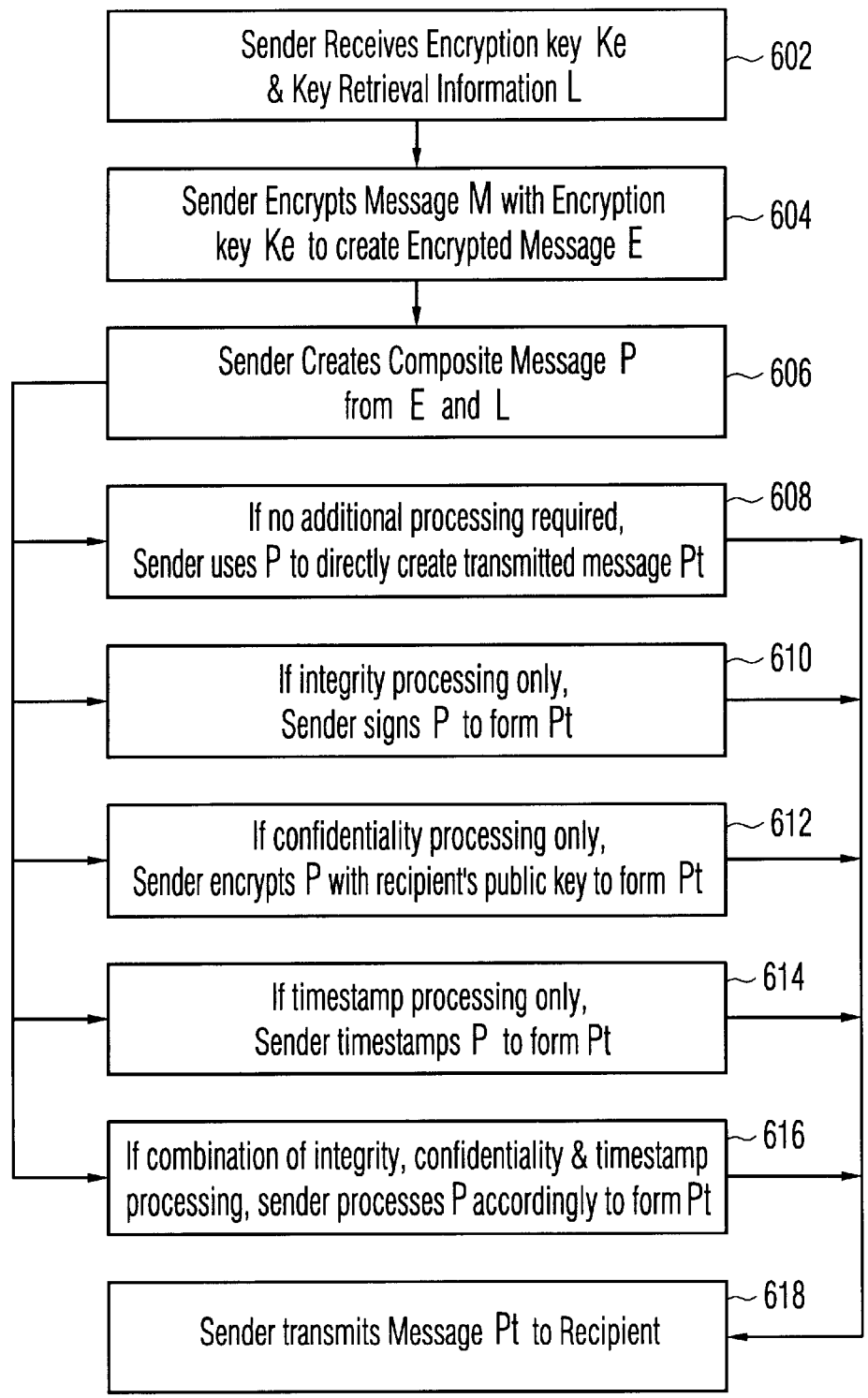
FIG. 6 shows the process for a sender to format a message to be sent to the recipient.

FIG. 6 presents a flow chart 600 which represents the steps undertaken by the sender once the sender has an encryption key Ke and the key retrieval information L. In step 602, the sender receives the key request response from the key server. In step 604, the sender then encrypts the e-mail message M using encryption key Ke to create an encrypted message E. In step 606, the sender creates composite message P that comprises the encrypted message E and the key retrieval information L.

The present invention contemplates that the sender may transmit composite message P to the recipient without performing any further cryptographic operations on the message. In such case, no additional integrity or confidentiality processing is performed, and message P is directly used to form transmittal message Pt 608.

The present invention also contemplates that the sender may wish to perform additional processing on composite message P before transmission, to ensure the integrity, confidentiality and timeliness of the composite message P.

To ensure only the integrity of the composite message P, the sender may digitally sign composite message P to form transmittal message Pt in step 610. Any digital signature procedure may be used to sign composite message P; the following procedure details only one possible signature procedure. A hash value H is first computed using the composite message P as input to a cryptographic hash function. A signature value S is then computed by encrypting H with a private key corresponding to a digital certificate owned by the sender. The sender then constructs a transmittal message Pt that comprises composite message P and signature value S. The transmittal message Pt is then sent to the recipient. The recipient can then verify the integrity of original composite message P by validating the contents of transmittal message Pt.

To ensure only the confidentiality of composite message P, the sender may encrypt composite message P to form transmittal message Pt in step 612. Again, any digital encryption procedure may be used to encrypt composite message P; the following procedure details only one possible procedure. The composite message P is first encrypted to form encrypted message Pe, using a randomly-generated symmetric encryption key Ks. The symmetric key Ks is then itself encrypted using the public key published in a digital certificate owned by the recipient, to form Kp. The sender then constructs a transmittal message Pt that comprises the encrypted message Pe and the encrypted symmetric key Kp.

The transmittal message Pt is then sent to the recipient. The recipient can then obtain the contents of original composite message P by decrypting the contents of transmittal message Pt. While the above description contemplates encrypting P, one may instead choose to encrypt only the key retrieval information L contained in P when forming Pt so as to realize certain efficiencies.

To ensure only the timeliness of composite message P, the sender may timestamp composite message P to form transmittal message Pt in step 614. Any timestamping procedure known to those skilled in the art may be used to timestamp composite message P.

The processing steps to ensure integrity protection, confidentiality or timeliness can be applied in combination to a single composite message P to form the transmittal message Pt. The sender can sign, encrypt and timestamp composite message P in any combination and in any order desired by the sender. It should be noted, however, that the processing steps detailed above are but three examples of many possible methods for providing message integrity, confidentiality and timeliness services. Many other methods are possible.

Thus, the sender may form the transmittal message Pt by performing the signing, encrypting and timestamping operations in any combination and in any order on the composite message P to form the transmittal message Pt in step 616. Transmittal message Pt typically will include additional fields containing information for use by the recipient in reversing the processing applied by the sender, so as to extract message P. Regardless of how transmittal message Pt is formed, in step 618 the sender then sends Pt to the recipient. But because the recipient does not have the decryption key Kd corresponding to the encryption Ke used to encrypt the message M, the recipient cannot read the original message M. However, the recipient will have sufficient information to make a request to the key server to obtain decryption key Kd so that the recipient can ultimately read the contents of message M.

It should be noted here, however, that for the sender to sign or encrypt message P, the sender and the recipient must have access to each other's digital certificates. The sender and receiver can exchange their digital certificates directly, publish their certificates in a shared directory, utilize the features of an appropriate public key infrastructure to exchange them, or obtain them through other means known to those skilled in the art.

Figure 7:
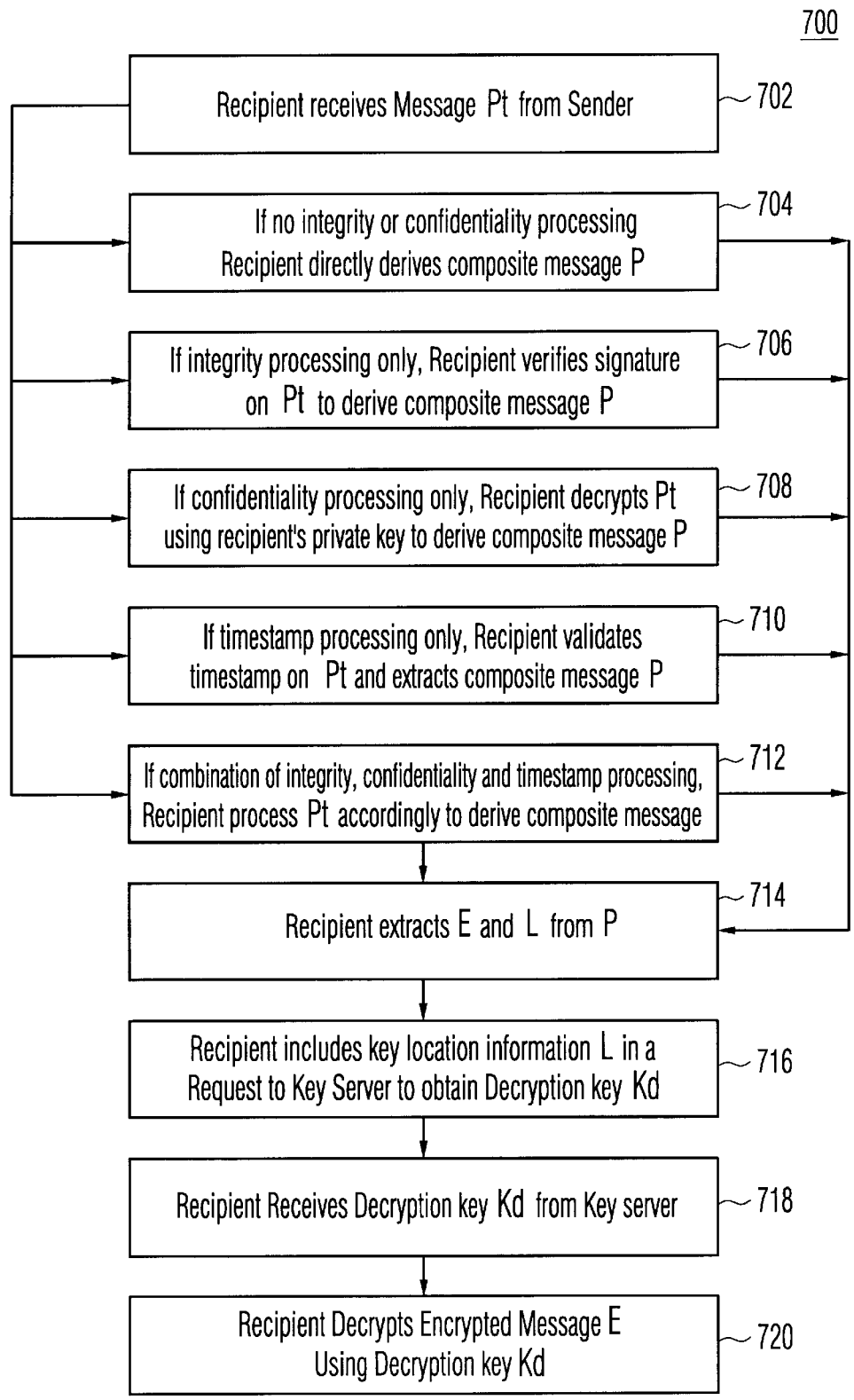
FIG. 7 is a flowchart showing the steps executed by the recipient to process the transmittal message received from the sender.

FIG. 7 shows a flow chart 700 that presents the steps undertaken by the recipient to ultimately read the contents of message M. In step 702, the recipient receives the transmittal message Pt from the sender. If the transmittal message Pt was not formed with any additional integrity protection, confidentiality or timeliness processing, the original composite message P is extracted directly from transmittal message Pt in step 704.

If the transmittal message Pt was formed including integrity protection, the message is first processed to verify the digital signature information contained in Pt in step 706. The verification procedure must match the signing procedure used by the sender to sign the message. According to the example given above, the recipient first computes a test hash value T from the composite message P contained in transmittal message Pt. The recipient then decrypts the signature value S contained in transmittal message Pt to obtain the original hash value H. The signature value S is decrypted using the public key published in the digital certificate owned by the sender. If the test hash value T and the decrypted hash value H are identical, the integrity of the composite message P has been verified, proving the message contents are identical to those originally transmitted.

If the transmittal message Pt was formed including confidentiality protection, the message is first processed to decrypt the contents of transmittal message Pt in step 708. The decryption procedure must match the encryption procedure used by the sender to encrypt the message. According to the example given above, the recipient first decrypts the encrypted symmetric key Kp to obtain the original symmetric key Ks. The encrypted symmetric key Kp is decrypted using the private key corresponding to the public key published in a digital certificate owned by the recipient. The recipient then uses the symmetric key Ks to decrypt the encrypted message Pe, to obtain the original composite message P.

If the transmittal message Pt was formed including a secure digital timestamp, the message is first processed to verify the timestamping information in step 710. The timestamp validation procedure must match the timestamping procedure used by the sender to timestamp the message before transmission.

If the transmittal message Pt was formed using a combination of integrity protection, confidentiality or timeliness processing, in step 712 the recipient performs the preceding verification and/or decryption steps in the reverse order that the corresponding signing, encryption and/or timestamping steps were applied by the sender.

Once the original composite message P has been obtained, in step 714, the recipient extracts the encrypted message E and the key retrieval information L. However, the recipient still cannot read the original message M, because the recipient has not yet obtained the appropriate decryption key Kd to decrypt E. Therefore, in step 716 the recipient creates a key retrieval request 320 and sends this to the key server. The key retrieval request 320 contains the key retrieval information L 314, obtained from composite message P, and perhaps also other information 326. If the recipient is an enrolled user, the request also contains the credential information 324 of the recipient.

In step 718, the recipient receives the key retrieval response 330 from the key server. The response includes the decryption key Kd associated with key retrieval information L.

Finally, in step 720, the recipient decrypts the encrypted message E using decryption key Kd, to thereby read the contents of original message M.

Figure 8A:
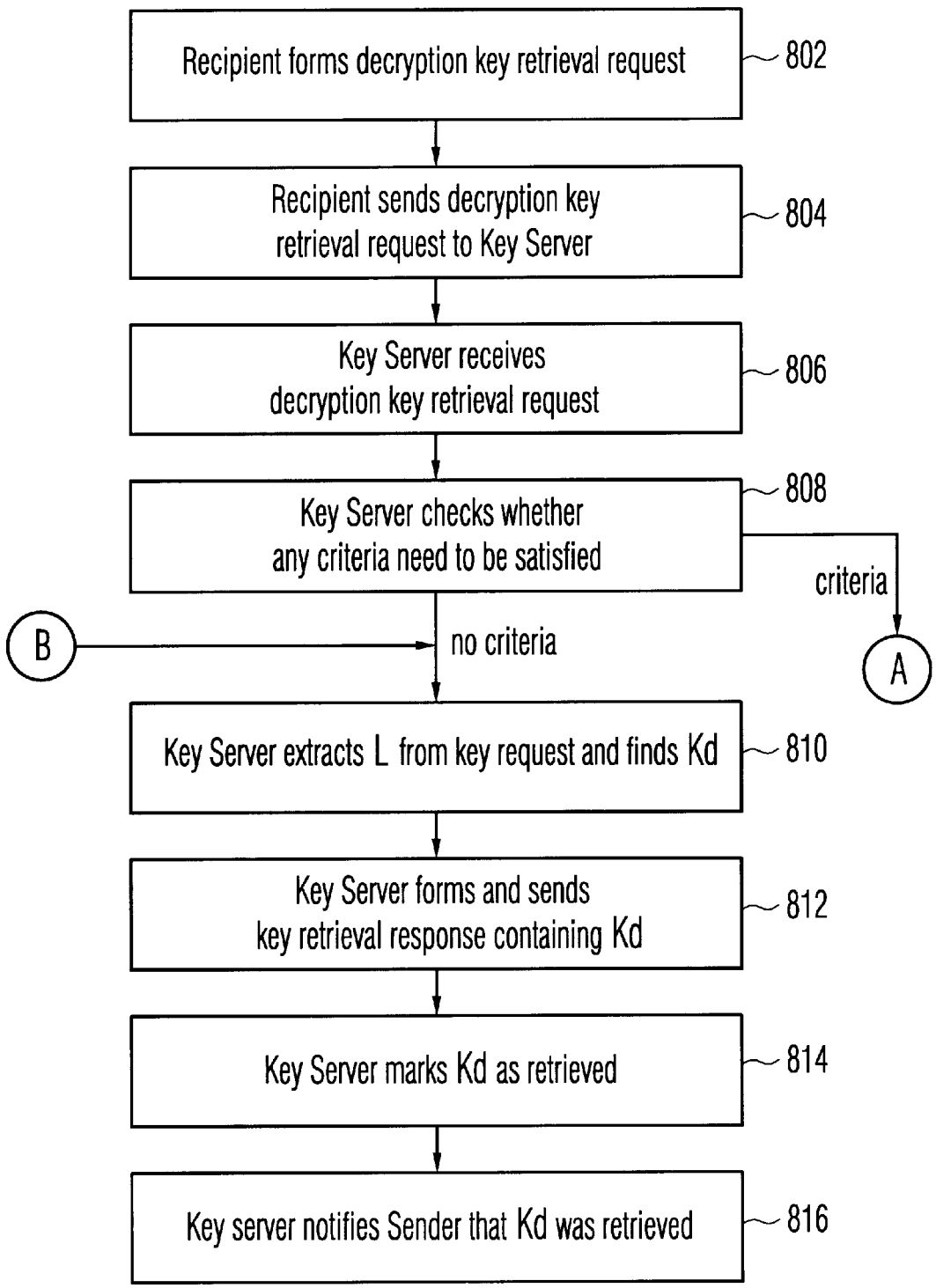
FIGS. 8a, 8b and 8c show a flowchart depicting the operation of the key server in responding to an encryption key retrieval request.
Figure 8B:
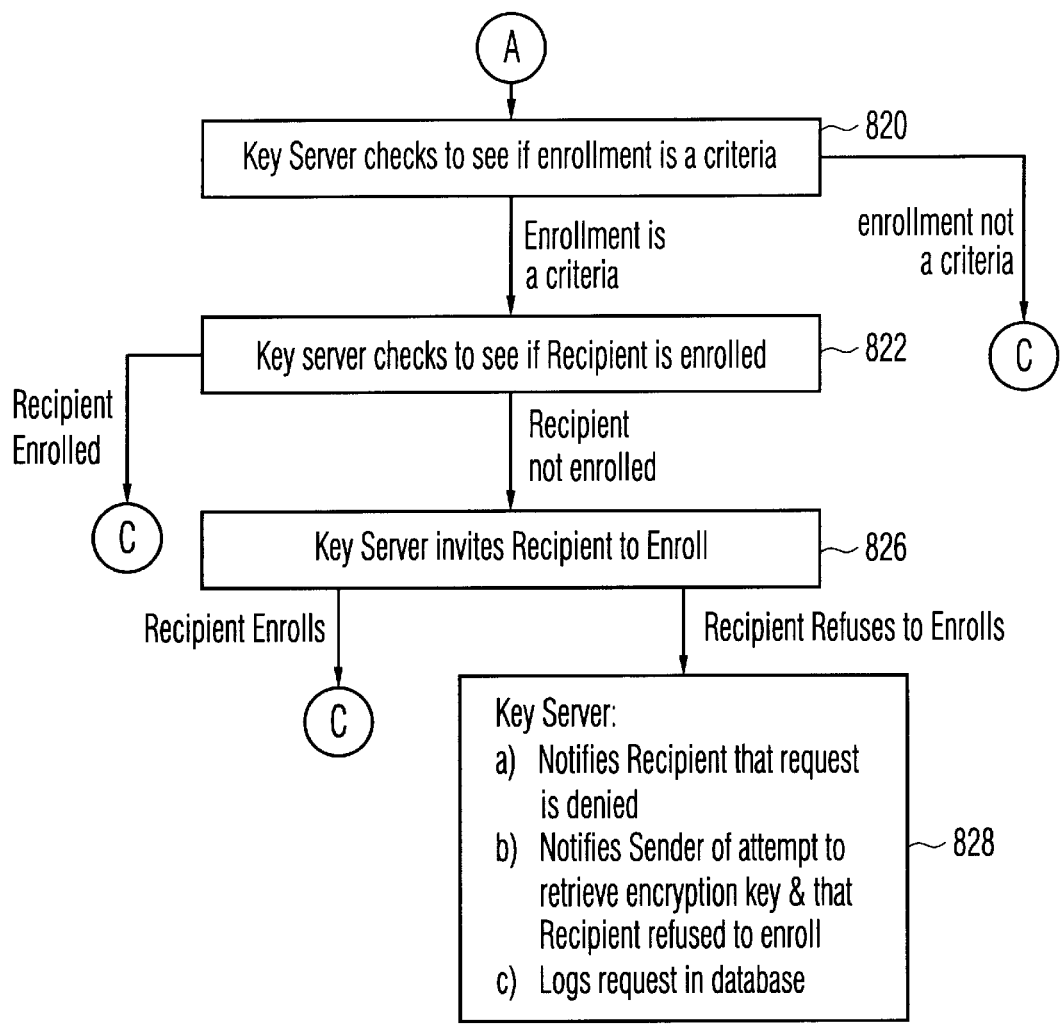
Figure 8C:
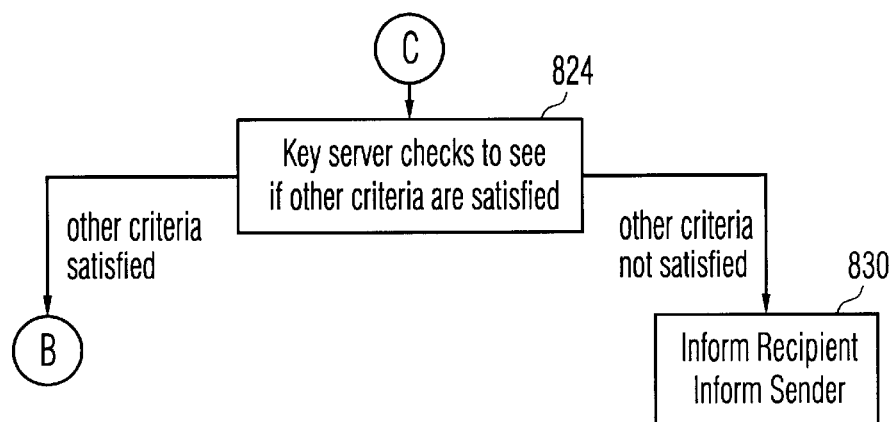

FIG. 8 presents a flow chart 800 illustrating the key server's actions in response to a key retrieval request 320 from the recipient. As discussed above, in step 802, the recipient forms a key retrieval request 320, including the key retrieval information L obtained from composite message P and the recipient's credential information (if the recipient is an enrolled user). In step 804, the recipient sends the key retrieval request to the key server and in step 806, the key server receives the key retrieval request.

In step 808, the key server checks to see whether a recipient is required to satisfy any criteria before the key server will provide the decryption key Kd to the recipient. If there are no such criteria, control proceeds to step 810, where the key server extracts the key retrieval information L from the retrieval key request and locates decryption key Kd in the database 108. In step 812, the key server then forms the key retrieval response 330, which includes the decryption key Kd 332, and sends it to the recipient.

In step 814, the key server also updates the database 108 by marking the decryption key Kd as having been retrieved.

Finally, if the sender requested at the time of enrollment that the key server actively notify the sender when a recipient retrieves a decryption key Kd, in step 816, the key server sends e-mail notification to the sender.

In step 808, if the key server determines that there are indeed certain criteria or qualifications which must be satisfied before the decryption key Kd will be provided in response to a key retrieval request, control flows to step 820. For example, in step 820, the key server may need to determine whether a recipient must be enrolled to be able to receive a decryption key. If this is not the case, control flows to step 824 where other qualifications are then examined. If, at step 820, it is determined that enrollment is a qualification, then control flows to step 822. In step 822, the key server checks to see whether the recipient has enrolled by examining the database 108. If the recipient is enrolled, then control flows to step 824 where the key server checks to see whether other criteria are satisfied.

If at step 822 it is determined that the recipient is not enrolled, control flows to step 826 where the key server may invite the recipient to enroll before the recipient can obtain the decryption key Kd. If the recipient accepts this invitation, the recipient is directed to the enrollment process associated with the key server. After the recipient enrolls, control is returned to step 824 for further checking of criteria. The sender may specify at time of enrollment whether or not recipients will be invited to enroll prior to granting or denying access to decryption keys.

If at step 826 the recipient refuses to enroll, control flows to step 828 where the key server refuses access to the requested decryption key. If the sender had requested at time of enrollment to be notified of refused key retrieval requests, the key server notifies the sender appropriately. The key server may optionally provide additional information pertaining to the reason behind the refusal, and/or update the database to reflect an unsuccessful key retrieval request.

At step 824, the key server checks to determine whether there are any other criteria before a recipient can be sent a key retrieval response. If all other criteria are satisfied, then the key server proceeds as normal and sends the key retrieval response to the recipient. If, on the other hand, one or more other criteria have not been satisfied, control flows to step 830 where the recipient is notified of the denial. Again, if the sender had requested at time of enrollment to be notified of refused key retrieval requests, the key server notifies the sender appropriately. The key server may optionally provide additional information pertaining to the reason behind the refusal, and/or update the database to reflect an unsuccessful key retrieval request.

If the sender and the recipient are both enrolled with the key server, then using the return receipt feature is transparent to users of the sender computer and the recipient computer. The MUA program on each computer will cooperate with the sender and the recipient to execute the steps of the present invention. For a user-sender, the MUA program on the sender's computer will provide a "return receipt option". In other words, the user-sender will address and prepare an email message as usual, and then mark the message for handling with return receipt notification. Communication between the sender computer and the key server is completely transparent to the user. The message is sent and, at some later point in time, the key server either sends the user-sender an e-mail message indicating that the decryption key Kd was retrieved, or provides a method whereby the user can view the current status of each message sent using return receipt processing. From time to time, the user-sender can then view the status of each message, for example, by visiting a web site that provides read-only access to the database 108 populated by the key server. FIG. 9 conceptually illustrates an e-mail message received by a user-sender from the key server and FIG. 10 conceptually illustrates a web page that the user-sender might see, when visiting the key server's web site to review key retrieval status information.

From the user-recipient's respective, the implementation of the present invention is transparent, as well. In reviewing his or her e-mail messages, a user-recipient receives a message from the sender and is notified of this on the user-recipient's mail MUA program screen. When the user-recipient opens that email message, the user-recipient's MUA program communicates with the key server to retrieve the decryption key Kd, and then decrypts and displays the message on the user-recipient's screen, all in response to the user-recipient's initial action to open the e-mail.

The sender can be notified when a decryption key is retrieved in a number of ways. One way is for the key server 106 to send an e-mail to the sender soon after the encryption key is sent to the recipient. A user at the sender computer can read the e-mail, at his or her leisure. Another way is for the server to generate a key retrieval status report from information stored in the database 108, that indicates which decryption keys have been retrieved, and, if the recipients are enrolled users, which recipient retrieved which key. This report can be retrieved from the server by viewing its contents on a web page or by any other acceptable means. The key server may optionally include additional information in the key retrieval status report, for example the time at which the key was retrieved.

The present invention is preferably implemented using either general or special purpose computers, on which executable software code is run. Each such computer is typically provided with hardware and/or ports to interface to at least one computer readable medium, such as a PROM, flash memory, CD-ROM, optical disk, hard drive disk, floppy disk or other non-volatile memory to store firmware and executable software code. The executable software code running on the various platforms may be downloaded from some computer readable medium via the Internet or other communication channel, or may be provided by other known means. Each computer will usually also have a second computer readable medium, such as associated RAM or other volatile memory to provide workplace for data and additional software.

In above description, symmetric keys are preferably used since they are computationally easier to manage. Preferably, the symmetric key encryption algorithms used during receipt processing and confidentiality processing include the FIPS 140-1 DES standard, the Triple-DES standard, the IDEA algorithm, and the Twofish algorithm.

Although symmetric encryption keys are preferred, one may instead use asymmetric encryption keys. In such case, the encryption key is sent to the sender and the decryption key is stored in the database. Typical realizations of the asymmetric encryption algorithms used for message integrity and confidentiality processing include the RSA algorithm, the Elliptic Curve algorithms, the E1 Gamal algorithms, and the DSA algorithms.

Furthermore, the certificates used by the sender and the recipient preferably are public key certificates, such as ITU X.509 certificates and Pretty Good Privacy (PGP) certificates.

Finally, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. An electronic messaging system having a return receipt feature, the system comprising a sender computer, a server computer and a recipient computer, wherein:

the sender computer is configured to send to the server computer, an issue request to have an encryption key issued;

the server computer is configured to receive the issue request, issue a first encryption key and key retrieval information to the sender computer in response to the issue request, and store a first decryption key corresponding to the first encryption key in an associated memory whose location is referenced by said key retrieval information;

the sender computer is further configured to encrypt a message using the first encryption key to thereby form an encrypted message, and send the encrypted message along with the key retrieval information to the recipient computer;

the recipient computer is configured to receive the encrypted message and the key retrieval information, and send to the server computer a retrieval request including the key retrieval information to obtain the corresponding first decryption key; and the server computer is further configured to receive the retrieval request from the recipient computer, send to the recipient computer the corresponding first decryption key, as indicated by the key retrieval information sent by the recipient computer, and notify the sender computer that the corresponding first decryption key was retrieved by the recipient.

2. The electronic messaging system according to claim 1, wherein the sender computer is further configured to encrypt at least the key retrieval information with a second encryption key which is different from the first encryption key, prior to sending the key retrieval information to the recipient computer.

3. A method for operating a server computer configured to provide a receipt message to a first computer, after receiving a request for information from a second computer, the method comprising:

a step of receiving a key issue request to provide an encryption key to a first party;

a step of sending a first encryption key to the first party along with key retrieval information leading to a first decryption key for decrypting a message encrypted using the first encryption key;

a step of receiving a retrieval request from a second party different from the first party, the retrieval request including the key retrieval information;

a step of sending the first decryption key information to the second party; and a step of notifying the first party after receiving the retrieval request from the second party.

4. A method according to claim 3, wherein the first encryption key and the first decryption key are the same.

5. A method according to claim 3, wherein the first encryption key and the first decryption key are different yet related through an asymmetric encryption algorithm.

6. A method according to claim 3, wherein the issue request and the retrieval request are both received via the Internet.

7. A method according to claim 3, further comprising:

a step of generating a first encryption key in response to the issue request;

a step of arranging the first encryption key and the key retrieval information into a response message;

a step of sending the response message to the first party; and a step of updating a record with information related to the first encryption key that was sent.

8. A computer readable medium storing executable software code thereon, the executable software code including:

code to receive an issue request to provide an encryption key to a first party;

code to send a first encryption key to the first party along with key retrieval information leading to a first decryption key for decrypting a message encrypted with first encryption key;

code to receive a retrieval request from a second party, the retrieval request including the key retrieval information;

code to send the first decryption key to the second party; and code to notify the first party after receiving the retrieval request from the second party.

9. The computer readable medium of claim 8, further comprising:

code to generate the first encryption key in response to the issue request;

code to arrange the first encryption key and the key retrieval information into a response message;

code to send the response message to the first party; and code to update A record with information related to the first encryption key that was sent.

10. A method for operating a first computer configured to send a message to a recipient and receive a receipt message in response thereto, the method comprising:

a step of sending a key issue request to obtain an encryption key;

a step of receiving a first encryption key along with key retrieval information leading to a first decryption key from a key server for decrypting a message encrypted using the first encryption key;

a step of encrypting a message with the first encryption key to form an encrypted message;

a step of sending the encrypted message and the key retrieval information to the recipient; and a step of receiving confirmation from the key server signifying that an attempt was made to retrieve the first decryption key.

11. The method according to claim 10, further comprising a step of encrypting at least the key retrieval information using a second encryption key which is different from the first encryption key, prior to sending the key retrieval information to the recipient.

12. A computer readable medium storing executable software code thereon, the executable software code including:

code to send a key issue request to obtain an encryption key:

code to receive a first encryption key along with key retrieval information leading to a first decryption key from a key server for decrypting a message encrypted using the first encryption key;

code to encrypt a message with the first encryption key to form an encrypted message;

code to send the encrypted message and the key retrieval information to a recipient; and code to receive confirmation from the key server signifying that an attempt was made to retrieve the first decryption key.

13. The computer readable medium of claim 12, further comprising:

code to encrypt at least the key retrieval information using a second encryption key which is different from the first encryption key, prior to sending the key retrieval information to the recipient.

* * * * *